United States Patent [19]

Wood

[11] Patent Number: 6,053,956
[45] Date of Patent: Apr. 25, 2000

[54] METHOD FOR MAKING ABRASIVE GRAIN USING IMPREGNATION AND ABRASIVE ARTICLES

[75] Inventor: William P. Wood, Golden Valley, Minn.

[73] Assignee: 3M Innovative Properties Company, St. Paul, Minn.

[21] Appl. No.: 09/081,365

[22] Filed: May 19, 1998

[51] Int. Cl.[7] .................................. B24D 3/34; C09K 3/14
[52] U.S. Cl. ................................ 51/309; 51/295; 51/293; 501/127
[58] Field of Search .......................... 51/293, 295, 309; 501/12, 127, 153

[56] References Cited

U.S. PATENT DOCUMENTS

| | | |
|---|---|---|
| 4,202,870 | 5/1980 | Weber et al. . |
| 4,314,827 | 2/1982 | Leitheiser et al. . |
| 4,518,397 | 5/1985 | Leitheiser et al. . |
| 4,574,003 | 3/1986 | Gerk . |
| 4,623,364 | 11/1986 | Cottringer et al. . |
| 4,676,928 | 6/1987 | Leach et al. . |
| 4,744,802 | 5/1988 | Schwabel . |
| 4,770,671 | 9/1988 | Monroe et al. . |
| 4,799,938 | 1/1989 | Janz et al. . |
| 4,848,041 | 7/1989 | Kruschke . |
| 4,881,951 | 11/1989 | Wood et al. . |
| 4,954,462 | 9/1990 | Wood et al. . |
| 4,964,883 | 10/1990 | Morris et al. . |
| 4,988,370 | 1/1991 | Haynes, Jr. . |
| 4,997,461 | 3/1991 | Markhoff-Matheny et al. . |
| 5,009,676 | 4/1991 | Rue et al. . |
| 5,011,508 | 4/1991 | Wald et al. . |
| 5,035,723 | 7/1991 | Kalinowski et al. . |
| 5,090,968 | 2/1992 | Pellow . |
| 5,094,672 | 3/1992 | Giles, Jr. et al. . |
| 5,139,978 | 8/1992 | Wood . |
| 5,152,917 | 10/1992 | Pieper et al. . |
| 5,160,509 | 11/1992 | Carman et al. . |
| 5,164,348 | 11/1992 | Wood . |
| 5,185,299 | 2/1993 | Wood et al. . |
| 5,201,916 | 4/1993 | Berg et al. . |
| 5,213,591 | 5/1993 | Celikkaya et al. . |
| 5,219,806 | 6/1993 | Wood . |
| 5,227,104 | 7/1993 | Bauer . |
| 5,304,331 | 4/1994 | Leonard et al. . |
| 5,366,523 | 11/1994 | Rowenhorst et al. . |
| 5,372,620 | 12/1994 | Rowse et al. . |
| 5,429,647 | 7/1995 | Larmie . |
| 5,431,705 | 7/1995 | Wood . |
| 5,435,816 | 7/1995 | Spurgeon et al. . |
| 5,489,204 | 5/1996 | Conwell et al. . |
| 5,498,269 | 3/1996 | Larmie . |
| 5,500,273 | 3/1996 | Holmes et al. . |
| 5,516,348 | 3/1996 | Conwell et al. . |
| 5,527,369 | 6/1996 | Garg . |
| 5,547,479 | 8/1996 | Conwell et al. . |
| 5,551,963 | 9/1996 | Larmie . |
| 5,593,467 | 1/1997 | Monroe . |
| 5,611,829 | 3/1997 | Monroe et al. . |
| 5,645,619 | 7/1997 | Erickson et al. . |
| 5,653,775 | 8/1997 | Plovnick et al. . |
| 5,672,097 | 9/1997 | Hoopman . |
| 5,728,184 | 3/1998 | Monroe . |

FOREIGN PATENT DOCUMENTS

| | | |
|---|---|---|
| 0 359 127 | 3/1990 | European Pat. Off. . |
| 0 558 068 | 9/1993 | European Pat. Off. . |
| WO 96/32226 | 10/1996 | WIPO . |
| WO 98/12151 | 3/1998 | WIPO . |
| WO 98/12152 | 3/1998 | WIPO . |
| WO 98/12276 | 3/1998 | WIPO . |

*Primary Examiner*—Michael Marcheschi
*Attorney, Agent, or Firm*—Gregory D. Allen

[57] ABSTRACT

Method for making alpha alumina-based abrasive grain, wherein during an impregnation step of the method, alpha alumina-based ceramic precursor particles conchoidally fracture. The abrasive grain can be incorporated into abrasive products such as coated abrasives, bonded abrasives, and non-woven abrasives.

60 Claims, 3 Drawing Sheets

METHOD FOR MAKING ABRASIVE GRAIN USING IMPREGNATION AND ABRASIVE ARTICLES

FIELD OF THE INVENTION

The present invention relates to a method for making alpha alumna-based abrasive grain. The abrasive grain can be incorporated into abrasive products such as coated abrasives, bonded abrasives, and non-woven abrasives.

DESCRIPTION OF RELATED ART

Fused alumina abrasive grain have been utilized in abrasive applications for close to one hundred years. Such abrasive grain are made by heating an alumina source above its melting point, quenching, and then crushing to form alumina abrasive grain or particles.

In the early 1980's a new and substantially improved type of alumina abrasive grain, commonly referred to as "sol gel" or "sol gel-derived" abrasive grain, was commercialized. In general, sol gel abrasive grain are typically made by preparing a dispersion or sol comprising water and alumina monohydrate (boehmite), gelling the dispersion, drying the gelled dispersion, crushing the dried dispersion into particles, calcining the particles to remove volatiles, and sintering the calcined particles at a temperature below the melting point of alumina. Frequently, the dispersion also includes one or more oxide modifiers, nucleating agents, and/or precursors thereof. Further details regarding sol gel abrasive grain, including methods for making them, can be found, for example, in U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie).

Some methods for making sol gel alpha alumina-based abrasive grain utilize an impregnation step wherein the dried or calcined material (i.e., ceramic precursor material) is impregnated with a composition that includes metal oxide, metal oxide precursor, and/or combinations thereof, and a liquid medium, to provide an impregnated abrasive grain precursor. After the impregnation step, the impregnated ceramic precursor material is typically dried and then calcined (generally, this is a second calcining step) to form an impregnated, calcined ceramic precursor material, which is in turn sintered (see, e.g., U.S. Pat. No. 5,139,978 (Wood), U.S. Pat. No. 5,164,348 (Wood), U.S. Pat. No. 5,213,591 (Celikkaya et al.) and U.S. Pat. No. 5,011,508 (Wald et al.)).

Typically, conventional sol gel-derived alpha alumina-based precursor material during impregnation remains intact (i.e., the precursor material does not spilt or crack)when impregnated by a liquid or solution. Although not wanting to be bound by theory, it is believed such cracking does not occur for one or more reasons. First, a conventional sol gel-derived alpha alumina-based abrasive grain precursor generally contains cracks generated during drying, crushing, and/or calcining steps. Such cracks are believed to provide a path of escape during impregnation for entrapped air, thereby preventing sufficient buildup of air pressure within the particle to cause cracking. Second, as the size of the sol-gel derived alpha alumina precursor material is reduced, for example, by crushing, the volume of air which may be entrapped during impregnation is also reduced (i.e., smaller particles of the precursor material have proportionately smaller volumes of air therein), thereby not providing sufficient air, even if some or all of it were entrapped, to cause cracking or splitting of the abrasive grain precursor. However, larger sol-gel derived alpha alumina precursor, if impregnated, may split when impregnated.

In another aspect, a common, optional step in conventional sol gel processes for making abrasive grain is crushing the dried gel (see, e.g., U.S. Pat. No. 4,314,827 (Leitheiser et al.), U.S. Pat. No. 4,518,397 (Leitheiser et al.), U.S. Pat. No. 4,744,802 (Schwabel), U.S. Pat. No. 4,881,951 (Wood et al.), and U.S. Pat. No. 5,139,978 (Wood)). Typically, the crushed material does not provide a single grade, or size range, of dried particles, but rather a large distribution of particle sizes. Particles less than about 60 micrometers in size are commonly referred to as "fines". In some instances, these fines are too small to be economically further processed into sintered abrasive particles using the same techniques (typically rotary calcining and sintering) used to further process the larger sized dried particles (see, e.g., U.S. Pat. No. 5,489,204 (Conwell et al.)). In crushing the dried gel, it is preferable to provide the maximum number of particles with the desired sizes (e.g., a desired particle size distribution) with the fewest number of crushing and screening steps. If the dried gel is crushed excessively, too many fines are typically produced. However, if the dried gel is not crushed enough, too many large particles are provided. Further, it is typically desirable to provide sharp (i.e., sharp edged) abrasive grain rather than dull or blocky abrasive grain. Recrushing larger sized dried gel typically leads to providing more of the undesirable dull or blocky abrasive grain.

In an effort to eliminate the dried fines, attempts have been made to incorporate them back into the sol gel process (i.e., to recycle them into new dried particles, and ultimately into sintered abrasive grain). For example, U.S. Pat. No. 4,314,827 (Leitheiser et al.), the disclosure of which is incorporated herein by reference, teaches redispersing the fines in a sol or dispersion. A drop in abrading performance and other properties (e.g., density and hardness), however can be experienced when too many fines are recycled. One need in the art is a process wherein such recycled material can be used to make abrasive grain having good abrading performance characteristics.

SUMMARY OF THE INVENTION

The present invention provides a method for making alpha alumina-based ceramic abrasive grains, the method comprising the steps of:

(a) impregnating an impregnation composition comprising a liquid (preferably, water) into an initial, porous, calcined, elongated particle (typically a plurality of particles) of alpha alumina-based precursor each having a longitudinal axis and interconnected internal pores, the particle being capable of receiving the liquid and upon impregnation fracturing generally in the direction of the longitudinal axis into smaller elongated particles to cause conchoidal fracture of the elongated particle (or, if a plurality of particles, at least a portion thereof) into the smaller elongated particles, wherein the initial elongated particle(s) of alpha alumina-based precursor is subjected to an external pressure above 1 atmosphere (preferably at least 1.25 atm.; more preferably at least 1.5 atm.; even more preferably at least 2 atm., 2.5 atm., 3 atm., 4 atm., 5 atm., or more) during at least a portion of the impregnation such that the number of smaller particles is increased as compared to such impregnation of such particles at 1 atm.; and (b) converting the smaller elongated particles to alpha alumina-based ceramic abrasive grain.

Optionally, the impregnation composition comprises a mixture comprising the liquid and at least one of a metal oxide(s) or a precursor(s) thereof; and is preparable by (and is typically prepared by) combining components comprising the liquid with at least one of a metal oxide(s) or a precursor (s) thereof.

In another aspect, preferably immediately prior to the impregnation step, the elongated particle(s) of alpha alumina-based precursor is subjected to an external pressure above 1 atmosphere (preferably at least 1.25 atm.; more preferably at least 1.5 atm.; even more preferably at least 2 atm., 2.5 atm., 3 atm., 4 atm., 5 atm., or more). In another aspect, the porous, calcined, elongated particle(s) is preferably subjected to a higher external pressure during impregnation than it was subjected to prior to impregnation.

Preferably, the use of the external pressure above 1 atmosphere increases the number of the "particles" by at least 25%; more preferably, at least 50%. That is, if ten porous, calcined, elongated particles of alpha alumina-based precursor, impregnated at 1 atmosphere provide, on average (based on 5 separate impregnations), 20 total particles; and if ten porous, calcined, elongated particles of alpha alumina-based precursor, impregnated at a pressure above 1 atmosphere provide, on average (based on 5 separate impregnations), 30 total particles, the increase in the number of the "particles" is 50 percent.

The porous, calcined, elongated particle(s) is preferably provided by converting at least a portion of a dispersion comprising a mixture comprising liquid (preferably, water), peptizing agent (typically an acid), and boehmite into the porous, calcined, elongated particle(s); the dispersion being preparable by (and typically prepared by) combining components comprising liquid, peptizing agent, and boehmite. Optionally, the dispersion contains, on a theoretical metal oxide basis, less than 0.05 percent by weight of alpha alumina seeds or nucleating agent or nucleating material, based on the total theoretical metal oxide content of the dispersion, wherein it is understood that "less than 0.05 percent by weight of alpha alumina seeds or nucleating agent or nucleating material" includes zero percent by weight alpha alumina seeds, nucleating agent, or nucleating material, respectively.

Preferably, the dispersion is compacted (preferably, at a pressure of at least $3.5 \times 10^4$ kg/m$^2$ (50 lb/in$^2$); more preferably, at least $1.05 \times 10^5$ kg/m$^2$ or even at least $1.4 \times 10^5$ kg/m$^2$) prior to converting it to alpha alumina-based ceramic precursor material. Compacting the dispersion typically increases the density and significantly increases the abrading performance of the resulting abrasive grain in one or more abrading applications, particularly when compacted at a pressure of at least $3.5 \times 10^4$ kg/m$^2$.

Certain preferred impregnated precursor material utilized in the method according to the present invention comprise, on a theoretical metal oxide basis, at least 0.1 percent, greater than 0.5 percent, or even greater than 2 percent, by weight metal oxide, other than alumina, based on the total theoretical oxide content of the abrasive grain. In another aspect, certain preferred impregnated precursor material utilized in the method according to the present invention comprise, on a theoretical metal oxide basis, at least 0.1 percent (in some instances, preferably in the range from 0.1 percent to about 10 percent; or more preferably, in the range from about 0.5 percent to about 10 percent) by weight of metal oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, $SnO_2$, and ZnO, based on the total theoretical metal oxide content of the impregnated precursor material.

Optionally, the dispersion contains, on a theoretical metal oxide basis, less than 0.05 percent by weight of alpha alumina seeds or nucleating agent or nucleating material, based on the total theoretical metal oxide content of the dispersion, wherein it is understood that "less than 0.05 percent by weight of alpha alumina seeds or nucleating agent or nucleating material" includes zero percent by weight alpha alumina seeds, nucleating agent, or nucleating material, respectively.

In this application:

"Boehmite" refers to alpha alumina monohydrate and boehmite commonly referred to in the art as "pseudo" boehmite (i.e., $Al_2O_3 \cdot xH_2O$, wherein x=1 to 2).

"Converting", with regard to making the precursor material, refers to any step or series of steps that provide the precursor material, including deliquifying (typically drying).

"Ceramic precursor material" or "unsintered ceramic material" refers to deliquified or dried alumina-based dispersion (i.e., deliquified or dried ceramic precursor material) or calcined alumina-based dispersion (i.e., calcined ceramic precursor material), which is typically in the form of particles that have a density of less than 80% (typically less than 60%) of theoretical and are capable of being sintered and/or impregnated with an impregnation composition and then sintered to provide alpha alumina-based ceramic material.

"Alpha alumina-based ceramic abrasive grain" as used herein refers to sintered, polycrystalline ceramic abrasive grain that have been sintered to a density of greater than 90% (preferably, at least 92%, more preferably, at least 94%, or even at least 95% or 97%) of theoretical, and contain, on a theoretical metal oxide basis, at least 60% by weight $Al_2O_3$, wherein at least 50% by weight of the $Al_2O_3$ is present as alpha alumina.

"Elongated particles" have an aspect ratio (length to cross-section (e.g., diameter) of at least 2:1 (typically, at least 2.5 or 3:1). Referring to FIGS. 7A and 7B, elongated particle 70 has length 71, diameter 73, and an aspect ratio of length 71 divided by diameter 73. Referring to FIGS. 8A and 8B, elongated particle 80 has (curved) length 81, diameter 83, and an aspect ratio of length 81 divided by diameter 83. Referring to FIG. 9, elongated particle 90 has length, 91, variable diameters 93 and 93A, and an aspect ratio of length 91 divided by the average diameter.

"Interconnected internal pores" refers to pores which are located in the interior of a body and which are connected either directly or through adjoining pores to the surface such that a continuous path exists between the pore and the surface.

"Dispersion" refers to a solid-in-fluid (liquid and/or liquid and gas (e.g., air)) system wherein one phase comprises finely divided particles (in the colloidal size range) distributed throughout a fluid, and/or the fluid is distributed throughout the particles.

"Colloidal metal oxide sol" refers to a stable (i.e., the metal oxide solids in the sol or dispersion do not appear by visual inspection to begin to gel, separate, or settle upon standing undisturbed for about 2 hours) suspension of colloidal particles (preferably in a liquid medium having a pH of less than 6.5).

"Nucleating material" refers to material that enhances the transformation of transitional alumina(s) to alpha alumina via extrinsic nucleation. The nucleating material can be a nucleating agent (i.e., material having the same or approximately the same crystalline structure as alpha alumina, or otherwise behaving as alpha alumina) itself (e.g., alpha alumina seeds, alpha $Fe_2O_3$ seeds, or alpha $Cr_2O_3$ seeds) or a precursor thereof.

In one aspect, the present invention also provides a method for making alpha alumina-based ceramic abrasive grains, the method comprising the steps of:

(a) preparing a first dispersion by combining components comprising water, acid, and boehmite;

(b) drying the first dispersion to provide alpha alumina-based precursor material;

(c) combining components comprising water and at least a portion of the alpha alumina-based precursor material to provide a second dispersion;

(d) converting at least a portion of the second dispersion into a porous, calcined, elongated particle of alpha alumina-based precursor each having a longitudinal axis and internal interconnected pores;

(e) impregnating a composition comprising a liquid into the elongated particle (or, if a plurality of particles, at least a portion thereof) to cause conchoidal fracture of the elongated particle into smaller elongated particles, the fracture occurring generally in the direction of the longitudinal axis, wherein the elongated particle(s) of alpha alumina-based precursor is subjected to an external pressure above 1 atmosphere (preferably at least 1.25 atm.; more preferably at least 1.5 atm.; even more preferably at least 2 atm., 2.5 atm., 3 atm., 4 atm., 5 atm., or more) during at least a portion of the impregnation such that the number of smaller particles is increased as compared to such impregnation of such particles at 1 atm.; and (f) converting the smaller elongated particles to alpha alumina-based ceramic abrasive grain.

In yet another aspect, the present invention provides a method for making alpha alumina-based ceramic abrasive grains, the method comprising the steps of:

(a) preparing a first dispersion by combining components comprising water, acid, and boehmite;

(b) drying the first dispersion to provide alpha alumina-based precursor material;

(c) combining components comprising water, boehmite, and at least a portion of the alpha alumina-based precursor material to provide a second dispersion;

(d) converting at least a portion of the second dispersion into a porous, calcined, elongated particle of alpha alumina-based precursor each having a longitudinal axis and internal interconnected pores;

(e) impregnating an impregnation composition comprising a liquid into the elongated particle (or, if a plurality of particles, at least a portion thereof) to cause conchoidal fracture of the elongated particle into smaller elongated particles, the fracture occurring generally in the direction of the longitudinal axis, wherein the elongated particle(s) of alpha alumina-based precursor is subjected to an external pressure above 1 atmosphere (preferably at least 1.25 atm.; more preferably at least 1.5 atm.; even more preferably at least 2 atm., 2.5 atm., 3 atm., 4 atm., 5 atm., or more) during at least a portion of the impregnation such that the number of smaller particles is increased as compared to such impregnation of such particles at 1 atm.; and (f) converting the smaller elongated particles to alpha alumina-based ceramic abrasive grain.

Abrasive grain made according to the methods of the present invention can be incorporated into abrasive products such as coated abrasives, bonded abrasives, non-woven abrasives, and abrasive brushes.

BRIEF DESCRIPTION OF THE DRAWING

FIGS. 4 and 6 are elevational plan views of an extruder useful in the methods according to the present invention, while

DETAILED DESCRIPTION

Figure 10A:
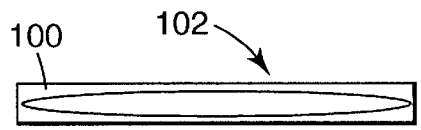
FIGS. 10A and 10B are cross-sectional views of an elongated particle during impregnation of liquid therein.
Figure 10B:
Figure 10C:
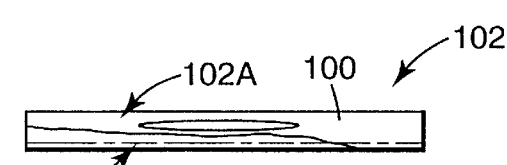
FIG. 10C is a cross-sectional view of the elongated particle shown in FIGS. 10A and 10B during impregnation of liquid therein after the elongated particle fractured into two elongated particles.
Figure 11:
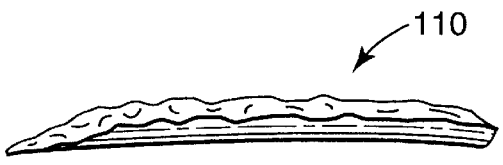
FIG. 11 is a perspective view of an elongated abrasive grain made by the method according to the present invention.

Surprisingly, the number of particles into which the elongated particles (conchoidally) fracture during the impregnation step of the method according to the present invention has been observed to increase with increasing pressure (see, e.g., working Examples 4–6, below). The particles resulting from the conchoidal fracture are typically sharp (see, e.g., particle 110 in FIG. 11). An illustrative depiction of the impregnation, and ultimate fracture, of a porous, calcined, elongated particle of alpha alumina-based precursor is provided in FIGS. 10A, 10B, and 10C, wherein liquid 100 penetrates into porous, calcined, elongated particle of alpha alumina-based precursor 102, resulting in the fracture of particle 102 into smaller elongated particles 102A and 102B.

Preferably, the (boehmite) dispersion is made by combining or mixing components comprising liquid medium, acid, at least 35 percent by weight boehmite, and optionally metal oxide and/or precursors thereof. The liquid medium in which the boehmite is dispersed is typically water (preferably deionized water), although organic solvents, such as lower alcohols (typically $C_{1-6}$ alcohols), hexane, or heptane, may also be useful as the liquid medium. In some instances, it is preferable to heat the liquid medium (e.g., 60–70° C) to improve the dispersibility of the boehmite.

Typically, the dispersion comprises at least about 20% by weight (generally from about 20% to about 70% by weight)

liquid medium, based on the total weight of the dispersion. More typically, the dispersion comprises, less than about 65% by weight or less, about 60% by weight or less, about 55% by weight or less, about 50% by weight or less, about 45% by weight or less, about 42% by weight or less, about 41% by weight or less, about 40% by weight or less, about 39% by weight or less, about 38% by weight or less, about 37% by weight or less, about 35% by weight or less, or about 25% by weight or less, liquid medium, based on the total weight of the dispersion.

In another aspect, the dispersion typically comprises greater than 35% by weight (generally from greater than 35% to about 80% by weight) solids, based on the total weight of the dispersion. Certain dispersions, however, comprise 40% by weight or more, 45% by weight or more, 50% by weight or more, 55% by weight or more, 58% by weight or more, 59% by weight or more, 60% by weight or more, 61% by weight or more, 62% by weight or more, 63% by weight or more, 65% by weight or more, 75% by weight or more, or even 80% by weight or more solids, based on the total weight of the dispersion.

In another aspect, the dispersion typically comprises greater than 35% by weight (generally from greater than 35% to about 80% by weight) boehmite, based on the total weight of the dispersion. Certain dispersion can, however, comprise 40% by weight or more, 45% by weight or more, 50% by weight or more, 55% by weight or more, 58% by weight or more, 59% by weight or more, 60% by weight or more, 61% by weight or more, 62% by weight or more, 63% by weight or more, 65% by weight or more, 75% by weight or more, or even 80% by weight or more boehmite, based on the total weight of the dispersion.

Weight percents of solids and boehmite above about 80 wt-% may also be useful, but tend to be more difficult to process to make the abrasive grain provided by the method according to the present invention.

Suitable boehmite can be prepared using various techniques known in the art (see, e.g., U.S. Pat. No. 4,202,870 (Weber et al.) and U.S. Pat. No. 4,676,928 (Leach et al.), the disclosures of which are incorporated herein by reference). Suitable boehmite can also be obtained, for example, from commercial sources such as Condea Chemie, GmbH of Hamburg, Germany (e.g., under the trade designation "DISPERAL"); and Vista Chemical Company of Houston, Tex. (e.g., under the 30 trade designations "DISPAL", "CATAPAL A," "CATAPAL B," and "CATAPAL D"). These aluminum oxide monohydrates are in the alpha form, and include relatively little, if any, hydrated phases other than monohydrates (although very small amounts of trihydrate impurities can be present in some commercial grade boehmite, which can be tolerated). They typically have a low solubility in water, and have a high surface area (typically at least about 180 $m^2/g$). Boehmite typically includes at least about 2–6 percent by weight free water (depending on the humidity) on its surface, and such water contributes to the amount of liquid medium in the dispersion.

Preferably, the boehmite used in the method according to the present invention has an average ultimate particle size of less than about 20 nanometers (more preferably, less than about 12 nanometers), wherein "particle size" is defined by the longest dimension of a particle.

Peptizing agents are generally soluble ionic compounds which are believed to cause the surface of a particle or colloid to be uniformly charged in a liquid medium (e.g., water). Such charged particles generally repel each other, resulting in the formation of stable, non-flocculated suspensions or sols. It is also believed that steric stabilization may result in the formation of a stable suspension by the adsorption of nonionic macromolecules on the surface of the particles. Such macromolecules are believed to prevent particles from coming in close proximity where van der Waals interactions would cause bonding.

Suitable acids, which are believed to function as a peptizing agent, also referred to as a dispersant, include monoprotic acids and acid compounds, such as acetic, hydrochloric, formic, and nitric acid. Nitric acid is a preferred peptizing agent. Some commercial sources of boehmite may contain acid titer, such as absorbed formic or nitric acid on the surface thereof. The amount of acid used depends, for example, on the dispersibility of the boehmite, the percent solids of the dispersion, the components of the dispersion, the amounts, or relative amounts of the components of the dispersion, the particle sizes of the components of the dispersion, and/or the particle size distribution of the components of the dispersion. Typically, the dispersion contains at least 3% to 8% by weight acid, based on the weight of boehmite in the dispersion.

Optionally, the boehmite dispersion may contain metal oxide (e.g., particles of metal oxide which may have been added as a particulate (preferably having a particle size (i.e., the longest dimension) of less than about 5 micrometers; more preferably, less than about 1 micrometer) and/or added as a metal oxide sol (including colloidal metal oxide sol)) and/or metal oxide precursor (e.g., a salt such as a metal nitrate, a metal acetate, a metal citrate, a metal formate, or a metal chloride that converts to a metal oxide upon decomposition by heating). The amount of such metal oxide and/or metal oxide precursor (that is in addition to the alumina provided by the boehmite) present in a dispersion or precursor (or metal oxide in the case of the abrasive grain) may vary depending, for example, on which metal oxide(s) is present and the properties desired for the sintered abrasive grain. For dispersions containing such metal oxides (and/or precursors thereof), the metal oxides (that are in addition to the alumina provided by the boehmite) are typically present, on a theoretical metal oxide basis, up to about 10 percent by weight (preferably, in the range from about 0.1 to about 10 percent; more preferably, in the range from about 0.5 to about 10 percent by weight), based on the total metal oxide content of the abrasive grain; or if the abrasive grain is to be "unseeded" (i.e., prepared without the use of nucleating material), such metal oxides are preferably present in the range from about 1 to about 10 percent (more preferably, about 2 to about 10 percent) by weight; although the amount may vary depending, for example, on which metal oxide(s) is present.

Metal oxide precursors include metal nitrate salts, metal acetate salts, metal citrate salts, metal formate salts, and metal chloride salts. Examples of nitrate salts include magnesium nitrate ($Mg(NO_3)_2.6H_2O$), cobalt nitrate ($Co(NO_3)_2.6H_2$), nickel nitrate ($Ni(NO_3)_2.6H_2O$), lithium nitrate ($Li\ NO_3$), manganese nitrate ($MN(NO_3)_2.\ 4H_2O$), chromium nitrate ($Cr(NO_3)_3.9H_2O$), yttrium nitrate ($Y(NO_3)_3.6H_2O$), praseodymium nitrate ($Pr(NO_3)_3.6H_2O$), samarium nitrate ($Sm(NO_3)_3.6H_2O$), neodymium nitrate ($Nd\ (NO_3)_3.6H_2O$), lanthanum nitrate ($La(NO_3)_3.6H_2O$), gadolinium nitrate ($Gd\ (NO_3)_3.5H_2O$), dysprosium nitrate ($Dy(NO_3)_3.5H_2O$), europium nitrate ($Eu(NO_3)_3.6H_2O$), ferric nitrate ($Fe(NO_3)_3.9H_2O$), zinc nitrate ($Zn(NO_3)_{3.6}H_2O$), erbium nitrate ($Er(NO_3)_3.5H_2O$), and zirconium nitrate ($Zr\ (NO_3)_4.\ 5H_2O$). Examples of metal acetate salts include zirconyl acetate ($ZrO\ (CH_3COO)_2$), magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, and dysprosium acetate. Examples of citrate salts include magnesium citrate, cobalt citrate, lithium citrate, and manganese citrate. Examples of formate salts include magnesium formate, cobalt formate, lithium formate, manganese formate, and nickel formate.

Although generally less preferred, metal chlorides may be used in place of, together with, or in addition to precursors such as the metal acetate, citrate, formate, and/or nitrate salts. Examples of chloride salts include magnesium chloride, cobalt chloride, nickel chloride, lithium chloride, manganese chloride, yttrium chloride, praseodymium chloride, samarium chloride, neodymium chloride, lanthanum chloride, gadolinium chloride, dysprosium chloride, europium chloride, ferric chloride, zinc chloride, titanium tetrachloride, and stannic chloride. Metal nitrate, acetate, citrate, formate, and chloride salts can be made by techniques known in the art, or obtained from commercial sources such as Alfa Chemicals of Ward Hill, Mass. and Mallinckrodt Chemicals of Paris, Ky.

The colloidal metal oxides are discrete finely divided particles of amorphous or crystalline metal oxide having one or more of their dimensions within a range of about 3 nanometers to about 1 micrometer. Metal oxide sols for use in methods according to the present invention include sols of ceria, silica, yttria, titania, lanthana, neodymia, zirconia, and mixtures thereof. Metal oxide sols are available, for example, from Nalco of Naperville, Ill.; and Eka Nobel of Augusta, Ga. Silica sols include those available under the trade designations "NALCO 1115," "NALCO 1130," "NALCO 2326," NALCO 1034A," and NALCOAG 1056"from Nalco Products, Inc. of Naperville, Ill., wherein the latter two are examples of acidic silica sols; and "NYACOL 215" from Eka Nobel, Inc. Ceria sols are available, for example, from Rhone-Ploulenc of Shelton, Conn.; Transelco of Penn Yan, N.Y.; and Fujimi Corp. of Japan. For more information on ceria, silica, or zirconia sols, see, for example, U.S. Pat. No. 5,429,647 (Larmie), U.S. Pat. No. 5,551,963 (Larmie), U.S. Pat. No. 5,611,829 (Monroe et al.), and U.S. Pat. No. 5,645,619 (Erickson et al.), the disclosures of which are incorporated herein by reference.

The metal oxide precursor in the dispersion may also be a precursor of colloidal metal oxide. Such precursors of colloidal metal oxide include a water-dispersible or water-soluble metal source that forms finely divided (1 nanometer to 1 micrometer) polymers or particles of metal oxide upon heating. Although a precursor of colloidal metal oxide is a material that is capable of forming finely divided metal oxide particles, it should be understood that the precursor of colloidal metal oxide need not form colloidal metal oxide under the conditions of the reactions described herein. The term colloidal metal oxide as used herein also encompasses chemical compounds colloidal in nature that comprise metal and oxygen (e.g., colloidal clays). This term also includes coated colloidal metal oxide, such as alumina-coated silica and zirconia-coated silica.

Whether from colloidal metal oxide directly, or from other forms or sources of colloidal metal oxide, the average metal oxide particle size in the colloidal metal oxide is preferably less than about 150 nanometers, more preferably less than about 100 nanometers, and most preferably less than about 50 nanometers. In some instances, the metal oxide particles can be on the order of about 3–10 nanometers. In most instances, the colloidal metal oxide comprises a distribution or range of metal oxide particle sizes.

Typically, the use of a metal oxide modifier can decrease the porosity of the sintered abrasive grain and thereby increase the density. Certain metal oxides may react with the alumina to form a reaction product and/or form crystalline phases with the alpha alumina which may be beneficial during use of the abrasive grain in abrading applications. For example, the oxides of cobalt, nickel, zinc, and magnesium typically react with alumina to form a spinel, whereas zirconia and hafnia do not react with the alumina. Alternatively, the reaction products of dysprosium oxide and gadolinium oxide with aluminum oxide are generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such aluminates have a hexagonal crystal structure. For additional details regarding the inclusion of metal oxide (and/or precursors thereof) in a boehmite dispersion see, for example, in U.S. Pat. No. 4,314,827 (Leitheiser et al.), U.S. Pat. No. 4,770,671 (Monroe et al.), U.S. Pat. No. 4,881,951 (Wood et al.) U.S. Pat. No. 5,429,647 (Larmie), and U.S. Pat. No. 5,551,963 (Larmie), the disclosures of which are incorporated herein by reference.

Optionally, the boehmite dispersion contains nucleating material such as alpha alumina, alpha iron oxide, and/or an alpha iron oxide precursor.

Typically, nucleating material, if present, comprises, on a theoretical metal oxide basis (based on the total metal oxide content of the calcined precursor material before sintering (or the sintered abrasive grain)), in the range from about 0.1 to about 5 percent by weight. Additional details regarding nucleating materials are disclosed, for example, in U.S. Pat. No. 4,623,364 (Cottringer et al.), U.S. Pat. No. 4,744,802 (Schwabel), U.S. Pat. No. 4,964,883 (Morris et al.), U.S. Pat. No. 5,139,978 (Wood), and U.S. Pat. No. 5,219,806 (Wood), the disclosures of which are incorporated herein by reference.

Sources of iron oxide, which in some cases may act as or provide a material that acts as a nucleating agent, include hematite (i.e., $\alpha$-$Fe_2O_3$), as well as precursors thereof (i.e., goethite ($\alpha$-FeOOH), lepidocrocite ($\gamma$-FeOOH), magnetite ($Fe_3O_4$), and maghemite ($\gamma$-$Fe_2O_3$)). Suitable precursors of iron oxide include iron-containing material that, when heated, will convert to $\alpha$-$Fe_2O_3$.

Iron oxide sources can be prepared by a variety of techniques well known in the art. For example, a dispersion of hematite ($\alpha$-$Fe_2O_3$) can be prepared by the thermal treatment of iron nitrate solutions, as is described, for example, by E. Matijevic et al., *J. Colloidal Interface Science*, 63, 509–24 (1978), and B. Voight et al., *Crystal Research Technology*, 21, 1177–83 (1986), the teachings of which are incorporated herein by reference. Lepidocrocite ($\gamma$-FeOOH) can be prepared, for example, by the oxidation of $Fe(OH)_2$ with a $NaNO_2$ solution. Maghemite ($\gamma$-$Fe_2O_3$) can be obtained, for example, by dehydrating $\gamma$-FeOOH in a vacuum. $\gamma$-FeOOH can also be converted to $\alpha$-$Fe_2O_3$, for example, by heating or grinding $\gamma$-FeOOH in air. Goethite ($\alpha$-FeOOH) can be synthesized, for example, by air oxidation of ferrous hydroxide or by aging a dispersion of ferric hydroxide at an elevated temperature and high pH. Additional information on the preparation of oxides of iron can be found, for example, in the articles by R. N. Sylva, *Rev. Pure Applied Chemistry*, 22, 15 (1972), and T. Misawa et al., *Corrosion Science*, 14 131 (1974), the teachings of which are incorporated herein by reference.

For additional details regarding the addition of iron sources to the dispersion or ceramic precursor material see, for example, U.S. Pat. No. 5,611,829 (Monroe et al.) and U.S. Pat. No. 5,645,619 (Erickson et al.), the disclosures of which are incorporated herein by reference.

A dispersion can be prepared, for example, by gradually adding a liquid component(s) to a component(s) that is non soluble in the liquid component(s), while the latter is mixing or tumbling. For example, a liquid containing water, nitric acid, and metal salt can be gradually added to boehmite, while the latter is being tumbled such that the liquid is more easily distributed throughout the boehmite. Suitable mixers include pail mixers (available, for example, from Sears Roebuck and Co.), sigma blade mixers (available, for example, from Paul 0. Abbe, Inc. of Little Falls, N.J.), and high shear mixers (available, for example, from Charles Ross & Son Co. of Hauppauge, N.Y.). Other suitable mixers may be available from Eirich Machines, Inc. of Gurnee, Ill.; Hosokawa-Bepex Corp. of Minneapolis, Minn. (including a mixer available under the trade designation "SCHUGI FLEX-O-MIX", Model FX-160); and Littleford-Day, Inc. of Florence, Ky. Other suitable preparation techniques may be apparent to those skilled in the art after reviewing the disclosure herein.

The dispersion typically gels prior to or during the deliquifying step. The addition of most modifiers can result in the dispersion gelling faster. Alternatively, ammonium acetate or other ionic species can be added to induce gelation of the dispersion. The pH of the dispersion and concentration of ions in the gel generally determines how fast the dispersion gels. Typically, the pH of the dispersion is within a range of about 1.5 to about 4. The dispersion is preferably gelled prior to the compaction or shaping (e.g., extrusion) step.

Preferably, the dispersion is compacted, for example, prior to or during extrusion (wherein the extrusion step may inherently involve compaction of the dispersion). In compacting the dispersion, it is understood that the dispersion is subjected to a pressure or force such as experienced, for example, in a pellitizer or die press (including mechanical, hydraulic and pneumatic or presses) or an extruder (i.e., all or substantially all of the dispersion experiences the specified pressure). In general, compacting the dispersion reduces the amount of air or gases entrapped in the dispersion, which in turn generally produces a less porous microstructure, that is more desirable.

The dispersion (including in this context a gelled dispersion, or even partially deliquified dispersion) can be converted into elongated precursor material (e.g., rods (including cylindrical rods and elliptical rods)), for example, by extrusion. Examples of suitable extruders include ram extruders, single screw, twin screw, single barrel, double barrel, and segmented screw extruders. Suitable extruders are available, for example, from Loomis Products of Levitown, Pa., Bonnot Co. of Uniontown, Ohio, and Hosokawa-Bepex of Minneapolis, Minn., which offers, for example, an extruder under the trade designation "EXTRUD-O-MIX" (Model EM-6). Dispersions having solids levels less than 70–75 percent by weight tend to be more suitable for extruding than are dispersions having solids levels greater than about 70–75 percent by weight.

If the elongated precursor material is a rod, it preferably has a diameter such that the sintered abrasive grain will have a diameter of, for example, about 150–5000 micrometers, and preferably, an aspect ratio (i.e., length to width ratio) of at least 2.5: 1, at least 4: 1, or even at least 5:1.

Figure 4:
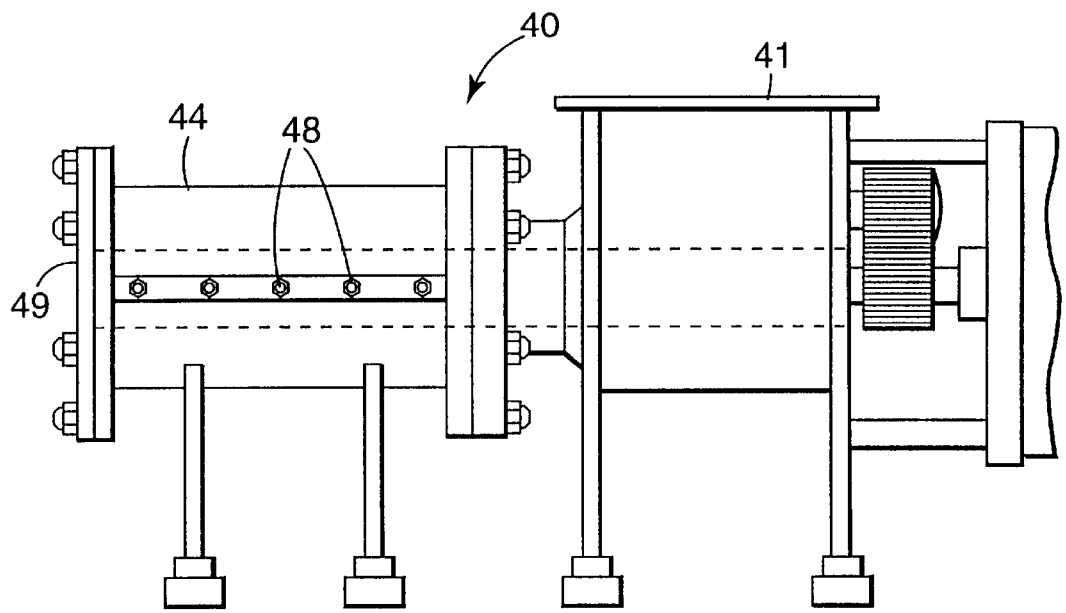
Figure 5:
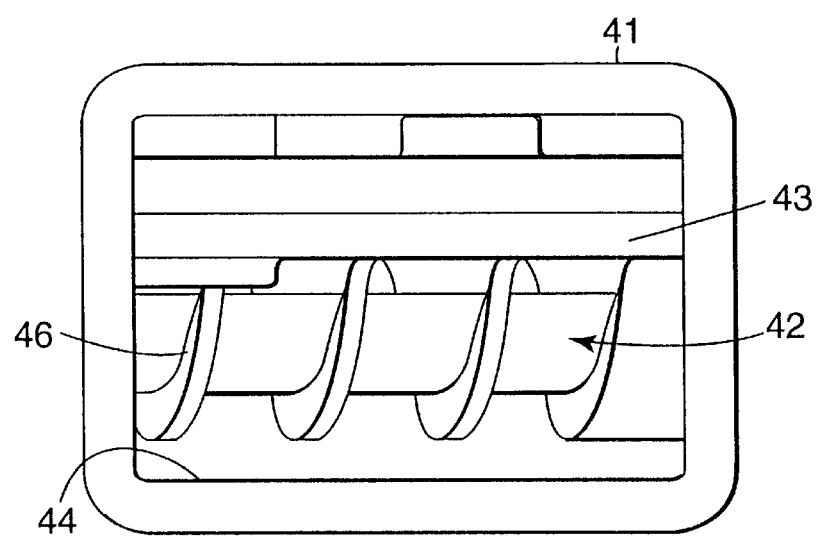
FIG. 5 is an enlarged top plan of the extruder feed port.
Figure 6:
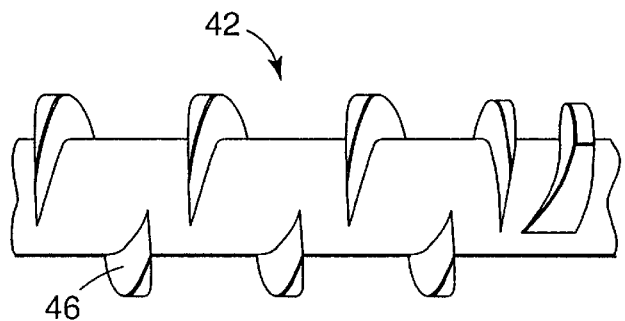
Figure 7A:
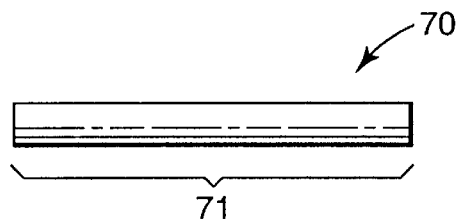
FIGS. 7A, 8A, and 9 are side views of elongated particles prior to impregnation.
Figure 7B:
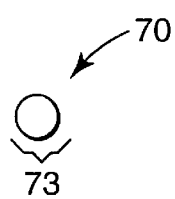
FIG. 7B is a cross-sectional view the elongated particle shown in FIG. 7A.
Figure 8A:
Figure 8B:
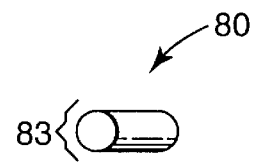
FIG. 8B is a perspective view of the elongated particle shown in FIG. 8A.
Figure 9:
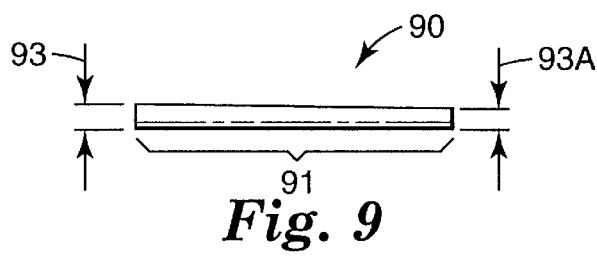

A preferred apparatus for compacting the dispersion (gelled or not) is illustrated in FIGS. 4–6. Modified segmented screw extruder 40, has feed port 41 and auger 42 centrally placed within barrel 44. FIG. 5 is a view of the interior of extruder 40 looking through feed port 41. Barrel 44 has grooves (not shown; generally known as "lands") running parallel down its length. Pins 48 extend centrally into barrel 44. Further, helical flight 46 extends the length of auger 42. Flight 46 is not continuous down the length of auger 42 but is segmented so that flight 46 on auger 42 does not come into contact with pins 48.

The dispersion (including in this context gelled dispersion) (not shown) is fed in feed port 41. Packer screw 43 urges the dispersion against auger 42 so that the dispersion is compacted by auger 42 and extruded through die 49. Die 49 can have a variety of apertures or holes therein (including a single hole or multiple holes). The die apertures can be any of a variety of cross sectional shapes, including a circle or polygon shapes (e.g., a square, star, diamond, trapezoid, or triangle). The die apertures can be any of a variety of sizes, but typically range from about 0.5 mm (0.02 inch) to 1.27 cm (0.5 inch), and more typically, from about 0.1 cm (0.04 inch) to about 0.8 cm (0.3 inch).

The extruded dispersion can be can be cut or sliced, for example, to provide discrete particles, and /or to provide particles having a more uniform length. Examples of methods for cutting (or slicing) the dispersion include blade cutters and wire cutters. The compacted dispersion can also be shredded and grated.

In general, techniques for deliquifying (including drying) the dispersion are known in the art, including heating to promote evaporation of the liquid medium, or simply drying in air. The deliquifying step generally removes a significant portion of the liquid medium from the dispersion; however, there still may be a minor portion (e.g., about 10% or less by weight) of the liquid medium present in the dried dispersion.

One skilled in the art, after reviewing the disclosure herein, should be able to select other techniques for deliquifying the dispersion, as well as select appropriate conditions such as drying temperature(s), drying time(s), drying rate(s) (including the heating and/or cooling rate(s)), environment(s) (including relative humidity, pressure (i.e., atmospheric pressure or a pressure above or below the atmospheric pressure)), and/or the component(s) making up the deliquifying or drying atmosphere, other than those specifically provided herein. The more suitable deliquifying or drying conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the deliquifying technique (s), the drying temperature(s), the drying time(s), the drying rates(s), and the component(s) making up the deliquifying or drying atmosphere).

Although the deliquified dispersion or ceramic precursor material may be reduced in size, for example, by crushing prior to calcining, while not wanting to be bound by theory, it is believed that it is typically preferred not to crush or otherwise stress the precursor material (prior to impregnation) such that cracks are present therein, as it is thought that the presence of such cracks may reduce the conchoidal fracturing that occurs during the impregnation step.

In general, techniques for calcining the deliquified dispersion or ceramic precursor material, wherein essentially all the volatiles are removed, and the various components that were present in the dispersion are transformed into oxides, are known in the art. Such techniques include using a rotary or static furnace to heat deliquified dispersion at temperatures ranging from about 400–1000° C. (typically from about 450–800° C.) until the free water, and typically until at least about 90 wt-% of any bound volatiles are removed. In some instances, it may be preferable to slowly heat the deliquified dispersion to the calcining temperature (e.g., heating the deliquified dispersion to 750° C. over a 6 hour period.

One skilled in the art, after reviewing the disclosure herein, may be able to select other techniques for calcining the deliquified dispersion, as well as select appropriate conditions such as calcining temperature(s), calcining time (s), calcining rate(s), (including the heating and/or cooling rate(s)), environment(s) (including relative humidity, pressure (i.e., atmospheric pressure or a pressure above or below the atmospheric pressure)), and/or the component(s) making up the calcining atmosphere, other than those specifically provided herein. The more suitable calcining conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the calcining temperature(s), the calcining time (s), the calcining rates(s), and the component(s) making up the calcining atmosphere).

Preferred calcining temperatures are typically not greater than 900° C. (more typically in the range from about 450° C. to about 800° C. (more preferably, about 600° C. to about 700° C.). It may, however, be desirable to utilize several different calcining conditions (including different temperatures) wherein, for example, the deliquified dispersion is partially calcined for a time at a temperature(s) below about 500° C., and then further calcined at a temperature(s) above about 600° C. Heating for the calcining step, which can be done, for example, using electrical resistance or gas, can be on a batch basis or on a continuous basis.

Methods of impregnating sol gel derived particles are described in general, for example, in U.S. Pat. No. 5,164,348 (Wood), the disclosure of which is incorporated herein by reference (also see, e.g., application having U.S. Ser. No. 08/781,557, filed Jan. 9, 1997, the disclosure of which is incorporated herein by reference). In general, ceramic precursor material (i.e., deliquified or dried alumina-based dispersion (or deliquified or dried ceramic precursor material), or calcined alumina-based dispersion (or calcined ceramic precursor material)) is porous. For example, a calcined ceramic precursor material typically has pores about 5–10 nanometers in diameter extending therein from an outer surface. The presence of such pores allows an impregnation composition comprising a mixture comprising liquid medium and optional appropriate metal oxide and/or precursor (preferably metal salts such as the metal nitrate, acetate, citrate, and formate salts described above with regard to preparation of a dispersion) to enter into, or in the case of particulate material on the surface of, ceramic precursor material. It is also within the scope of the present invention to impregnate with an aluminum salt, although typically the impregnate is a salt other than an aluminum salt. The metal salt material is dissolved in a liquid, and the resulting solution mixed with the porous ceramic precursor particle material. The impregnation process is thought to occur through capillary action.

Although not wanting to be bound by theory, calcined sol gel-derived alumina from boehmite available from Condea Chemie, GmbH under the trade designation "DISPERAL", typically has a large surface area (about 180 $m^2/g$), a large pore volume (about 55% open porosity), and a small pore diameter (about 6 nanometers). When a body of such material is immersed in a liquid which wets the alumina, it is thought that the liquid is drawn into the center of the body by capillary forces. Air is entrapped in the body as the liquid is drawn in. Although some air escapes as evidenced by a stream (sometimes more than one stream) of bubbles flowing from a particle, a portion of the air is compressed and forced into the center of the body by the impregnating liquid. The liquid continues to fill the body until the pressure of the entrapped air is equal to the capillary forces, at which time movement of the liquid into the body stops. However, it is believed that in the method according to the present invention, the pressure of the entrapped air exceeds the tensile strength of the calcined alumina particle resulting in the conchoidal fracture of the elongated particle, generally in the direction of its longitudinal axis. Further, it is believed that if sufficient cracking is present in the particle prior to impregnation, fracture resulting from the impregnation will be diminished (or not occur), as it is thought that sufficient air will be able to escape from the particle through such preexisting cracks rather than be entrapped, reducing or preventing the conchoidal fracturing.

The liquid used for the impregnating composition is preferably water (including deionized water), an organic solvent (preferably a non-polar solvent), and mixtures thereof.

If impregnation of a metal salt is desired, the concentration of the metal salt in the liquid medium is typically in the range from about 5% to about 40% dissolved solids, on a theoretical metal oxide basis. Preferably, there is at least 50 ml of solution added to achieve impregnation of 100 grams of porous precursor particulate material, more preferably, at least about 60 ml of solution to 100 grams of precursor particulate material.

In some instances, more than one impregnation step may be utilized. The same impregnation composition may be applied in repeated treatments, or subsequent impregnation compositions may contain different concentrations of the same salts, different salts, or different combinations of salts. Further, it is within the scope of the present invention to, for example, first impregnate the calcined precursor material with an impregnation composition comprising a mixture comprising liquid (e.g., water) and an acidic metal salt, and then further impregnate with a second impregnation composition comprising a mixture comprising liquid (e.g., water) and a base or basic salt (e.g., $NH_4OH$). Although not wanting to be bound by theory, it is believed that the second impregnation of the base or basic salt causes the impregnated acidic metal oxide precursor(s) to precipitate thereby reducing migration of the metal oxide precursors. For further details regarding such multiple impregnations involving acidic and basic materials see, for example, U.S. Pat. No. 5,164,348 (Wood) and U.S. Pat. No. 5,527,369 (Garg), the disclosures of which are incorporated herein by reference.

In another aspect, the impregnation composition may be comprised of a mixture comprising liquid, an acidic metal salt and a base precursor (e.g., urea or formamide, acetamide, hydroxlamine, and methylamin), wherein the latter decomposes on heating to yield a base. Again, although not wanting to be bound by theory, it is believed that the base causes the impregnated acidic metal salt to precipitate thereby reducing migration of the metal oxide precursors.

Techniques for applying external pressure to the porous, calcined, elongated particle(s) and then introducing the impregnation composition include placing the porous, calcined, elongated particle(s) in a pressure vessel (e.g., a 18.9 liter (5 gallon) spray paint pressure vessel available from Graco of Minneapolis, Minn.; Model # 236149, Series H96A), pressurizing the contents thereof, and followed by the introduction (while still under pressure) of the impregnation composition. Alternatively, for example, the porous, calcined, elongated particle(s) could be placed in a chamber fitted with a piston, wherein the piston is actuated to reduced the volume of the chamber thereby increasing the pressure within the chamber, followed by the introduction (while still under pressure) of the impregnation composition. Other ways of applying the external pressure prior to and/or during impregnation may be apparent to those skilled in the art after reviewing the disclosure herein.

The amount of particle fracture may be increased, for example, by use of thermal shock. For example, the calcined material could be added to the impregnation composition while the former is still hot.

During heat treatment of the impregnated particles to form the sintered, alpha alumina-based ceramic particles, metal oxide and/or precursor thereof in such particles may react with alumina to form a reaction product. For example, the oxides of cobalt, nickel, zinc, and magnesium typically react with alumina to form a spinel structure. Yttria typically reacts with alumina to form $3Y_2O_3 \cdot 5Al_2O_3$, which has the garnet crystal structure. Praseodymium, samarium, ytterbium, neodymium, lanthanum, gadolinium, cerium, dysprosium, erbium, and mixtures of two or more of these rare earth metals typically react with alumina to form garnet, beta alumina, or phases exhibiting a perovskite structure. Certain rare earth oxides and divalent metal oxides react with alumina to form a rare earth aluminate represented by the formula $LnMAl_{11}O_{19}$, wherein Ln is a trivalent metal ion such as La, Nd, Ce, Pr, Sm, Gd, or Eu, and M is a divalent metal cation such as Mg, Mn, Ni, Zn, Fe, or Co. Such rare earth aluminates typically have a hexagonal crystal structure that is sometimes referred to as a magnetoplumbite crystal structure. Hexagonal rare earth aluminates generally have exceptional properties in an abrasive particle and if present, are typically within the abrasive particle as a whisker(s) or platelet(s). Such whiskers or platelets typically have a length of about 0.5 micrometer to about 1 micrometer, and a thickness of about 0.1 micrometer or less. These whiskers or platelets are more likely to occur in the absence of a nucleating agent.

It is also within the scope of the present invention to coat the abrasive grain with a surface coating such as described in U.S. Pat. No. 1,910,440 (Nicholson), U.S. Pat. No. 3,041,156 (Rowse), U.S. Pat. No. 5,009,675 (Kunz et al.), U.S. Pat. No. 4,997,461 (Markhoff-Matheny et al.), and U.S. Pat. No. 5,042,991 (Kunz et al.), U.S. Pat. No. 5,011,508 (Wald et al.), and U.S. Pat. No. 5,213,591 (Celikkaya et al.), the disclosures of which are incorporated herein by reference.

In general, techniques for sintering the calcined material, which include heating at a temperature effective to transform transitional alumina(s) into alpha alumina, to causing all of the metal oxide precursors to either react with the alumina or form metal oxide, and increasing the density of the ceramic material, are known in the art. As used herein, transitional alumina is any crystallographic form of alumina that exists after heating the hydrated alumina to remove the water of hydration prior to transformation to alpha alumina (e.g., eta, theta, delta, chi, iota, kappa, and gamma forms of alumina and intermediate combinations of such forms). The calcined material can be sintered, for example, by heating (e.g., using electrical resistance, microwave, plasma, laser, or gas combustion, on batch basis (e.g., using a static furnace) or a continuous basis (e.g., using a rotary kiln)) at temperatures ranging from about 1200° C. to about 1650° C. (typically, from about 1200° C. to about 1550° C., more typically, from about 1300° C. to about 1450° C., or even from about 1350° C. to about 1450° C). The length of time which the calcined material is exposed to the sintering temperature depends, for example, on particle size, composition of the particles, and sintering temperature. Typically, sintering times range from a few seconds to about 60 minutes (preferably, within about 3–30 minutes). Sintering is typically accomplished in an oxidizing atmosphere, although neutral (e.g., argon or nitrogen) or reducing atmospheres (e.g., hydrogen or forming gas) may also be useful.

One skilled in the art, after reviewing the disclosure herein, may be able to select other techniques for sintering the calcined material, as well as select appropriate conditions such as sintering temperature(s), sintering time(s), sintering rate(s), (including the heating and/or cooling rate (s)), environment(s) (including relative humidity, pressure (i.e., atmospheric pressure or a pressure above or below the atmospheric pressure), and/or the component(s) making up the sintering atmosphere), other than those specifically provided herein. The more suitable sintering conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the sintering temperature(s), the sintering time (s), the sintering rates(s), and the component(s) making up the sintering atmosphere).

It may, however, be desirable to utilize several different sintering conditions (including different temperatures) wherein, for example, the calcined or ceramic precursor material is partially sintered for a time at a temperature(s) below 1200° C., and then further sintered at a temperature(s) above 1350° C.

Additional details regarding sintering can be found, for example, in U.S. Pat. Nos. 4,314,827 (Leitheiser et al.), U.S. Pat. No. 5,489,204 (Conwell et al.), U.S. Pat. No. 5,653,775 (Plovnick et al.), the disclosures of which are incorporated herein by reference.

Sintered alpha alumina-based abrasive grain made according to the method of the present invention typically comprise, on a theoretical metal oxide basis, at least 70 percent (preferably, at least 85 percent, more preferably, at least 90 percent, 95, 98, or even 99 percent) by weight $Al_2O_3$, based on the total weight of the abrasive grain, and have a Vickers hardness of at least about 16 GPa (preferably, at least about 18 GPa; more preferably at least about 19 GPa; and most preferably at least about 20 GPa).

The longest dimension of the alpha alumina-based abrasive grain is typically at least about 10 micrometers. The abrasive grain described herein can be readily made with a length of greater than about 100 micrometers, and larger abrasive grain (e.g., greater than about 1000 micrometers or even greater than about 5000, 10,000, or even 25,000 micrometers) can also be readily made. Generally, the preferred abrasive grain has a length in the range from about 100 to about 5000 micrometers (typically in the range from about 100 to about 3000 micrometers), although other sizes are also useful, and may even be preferred for certain applications. In another aspect, abrasive grain made according to the method of the present invention, typically have an aspect ratio of at least 1.5:1, preferably, at least 2:1, and more preferably, at least 2.5:1.

The dried, calcined, and/or sintered materials provided during or by the method according to the present invention, are typically screened and graded using techniques known in the art. For example, the dried particles are typically screened to a desired size prior to calcining. The sintered abrasive grain are typically screened and graded prior to use in an abrasive application or incorporation into an abrasive article.

It is also within the scope of the present invention to recycle unused (typically particles too small in size to provide the desired size of sintered abrasive grain) deliquified dispersion material as generally described, for example, in U.S. Pat. No. 4,314,827 (Leitheiser et al.), the disclosure of which is incorporated herein by reference. For example, a first dispersion can be made as described above, dried, crushed, and screened, and then a second dispersion made by combining, for example, liquid medium (preferably, aqueous), boehmite, and deliquified material from the first dispersion, and optionally metal oxide and/or metal oxide precursor. Optionally, the first dispersion includes nucleating material. The recycled material may provide, on a theoretical metal oxide basis, for example, at least 10 percent, at least 30 percent, at least 50 percent, or even up to (and including) 100 percent of the theoretical $Al_2O_3$ content of the dispersion which is deliquified and converted (including calcining and sintering) to provide the sintered abrasive grain.

Screening and grading of abrasive grain made according to the method of the present invention can be done, for example, using the well known techniques and standards for ANSI (American National Standard Institute), FEPA (Federation Europeenne des Fabricants de Products Abrasifs), or JIS (Japanese Industrial Standard) grade abrasive grain.

Abrasive grain made according to the method of the present invention can be used in conventional abrasive products, such as coated abrasive products, bonded abrasive products (including grinding wheels, cutoff wheels, and honing stones), nonwoven abrasive products, and abrasive brushes. Typically, abrasive products (i.e., abrasive articles) include binder and abrasive grain, at least a portion of which is abrasive grain made according to the method of the present invention, secured within the abrasive product by the binder. Methods of making such abrasive products are well known to those skilled in the art. Furthermore, abrasive grain made according to the method according to the present invention, can be used in abrasive applications that utilize slurries of abrading compounds (e.g., polishing compounds).

Coated abrasive products generally include a backing, abrasive grain, and at least one binder to hold the abrasive grain onto the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Preferred methods of making coated abrasive products are described, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), and U.S. Pat. No. 5,520,711 (Helmin), the disclosures of which are incorporated herein by reference.

The coated abrasive product can have an attachment means on its back surface to secure the coated abrasive product to a support pad or backup pad. Such attachment means can be, for example, a pressure sensitive adhesive or one side of a hook and loop attachment. The back side of the coated abrasive product may also contain a slip resistant or frictional coating. Examples of such coatings include an inorganic particulate material (e.g., calcium carbonate or quartz) dispersed in an adhesive.

Figure 1:
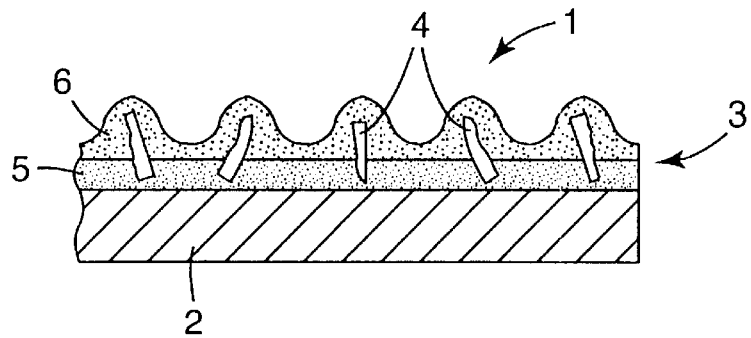
FIG. 1 is a fragmentary cross-sectional schematic view of a coated abrasive article including abrasive grain made according to the method of the present invention.

An example of a coated abrasive product is depicted in FIG. 1. Referring to this figure, coated abrasive product 1 has a backing (substrate) 2 and abrasive layer 3. Abrasive layer 3 includes abrasive grain 4 secured to a major surface of backing 2 by make coat 5 and size coat 6. In some instances, a supersize coat (not shown) is used.

Figure 2:
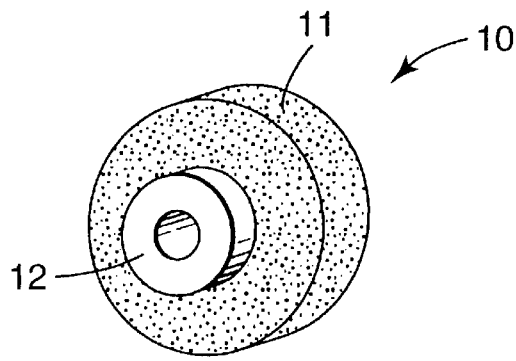
FIG. 2 is a perspective view of a bonded abrasive article including abrasive grain made according to the method of the present invention.

Bonded abrasive products typically include a shaped mass of abrasive grain held together by an organic, metallic, or vitrified binder. Such shaped mass can be, for example, in the form of a wheel, such as a grinding wheel or cutoff wheel. It can also be in the form, for example, of a honing stone or other conventional bonded abrasive shape. It is preferably in the form of a grinding wheel. Referring to FIG. 2, grinding wheel 10 is depicted, which includes abrasive grain 11, at least a portion of which is abrasive grain made according to the method of the present invention, molded in a wheel and mounted on hub 12. For further details regarding bonded abrasive products, see, for example, U.S. Pat. No. 4,997,461 (Markhoff-Matheny et al.), the disclosure of which is incorporated herein by reference. Preferred binders that can be used are curable at temperatures and under conditions that will not adversely affect the abrasive grain.

Figure 3:
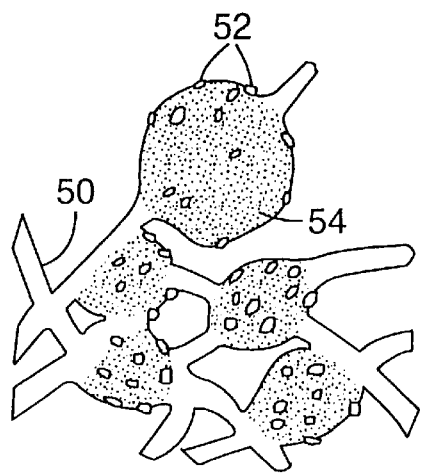
FIG. 3 is an enlarged schematic view of a nonwoven abrasive article including abrasive grain made according to the method of the present invention.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which abrasive grain 52, at least a portion of which is abrasive grain made according to the method of the present invention, are adhered by binder 54. For further details regarding nonwoven abrasive products, see, for example, U.S. Pat. No. 2,958,593 (Hoover et al.), the disclosure of which is incorporated herein by reference.

Useful abrasive brushes including abrasive grain made according to the method of the present invention include those having a plurality of bristles unitary with a backing (see, e.g., U.S. Pat. No. 5,679,067 (Johnson et al.), the disclosure of which is incorporated herein by reference). Preferably, such brushes are made by injection molding a mixture of polymer and abrasive grain.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or a filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

Abrasive grain made according to the method of the present invention, can include a surface coating. Surface coatings are known to improve the adhesion between the abrasive grain and the binder in abrasive products, and in some cases to improve the abrading properties of the abrasive grain. Such surface coatings are, for example, described in U.S. Pat. No. 5,011,508 (Wald et al.), U.S. Pat. No. 5,009,675 (Kunz et al.), U.S. Pat. No. 4,997,461 (Markhoff-Matheny et al.), U.S. Pat. No. 5,213,591 (Celikkaya et al.), U.S. Pat. No. 5,085,671 (Martin et al.), and U.S. Pat. No. 5,042,991 (Kunz et al.), the disclosures of which are incorporated herein by reference.

The abrasive products can contain 100% abrasive grain made according to the method of the present invention, or they can contain a blend of abrasive grain made according to the method of the present invention with conventional abrasive grain and/or diluent particles. However, at least about 5% by weight, and preferably about 30–100% by weight, of the abrasive grain in the abrasive products should be abrasive grain made according to the method of the present invention. Examples of suitable conventional abrasive grain include fused aluminum oxide, silicon carbide, diamond, cubic boron nitride, garnet, fused alumina zirconia, and other sol-gel abrasive grain, and the like. Examples of suitable diluent particles include marble, gypsum, flint, silica, iron oxide, aluminum silicate, glass, and diluent agglomerates. Abrasive grain made according to the method of the present invention can also be combined in or with abrasive agglomerates. An example of an abrasive agglomerate is described in U.S. Pat. No. 4,311,489 (Kressner), U.S. Pat. No. 4,652,275 (Bloecher et al.), and U.S. Pat. No. 4,799,939 (Bloecher et al.), the disclosures of which are incorporated herein by reference.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Any reference to the percent solids levels of the dispersion used in the following examples are the approximate solids levels, as they do not take into account the 2–6% water commonly found on the surface of boehmite, nor the solids provided by any non-boehmite additives.

Examples 1–2 and Comparative Example A

Examples 1 and 2 illustrate that the fracture of calcined alpha alumina-based abrasive grain precursor into additional pieces can be increased by the application of an external pressure to the precursor material (a) prior to and (b) prior to and during impregnation with a liquid.

A boehmite sol was prepared by mixing 1194 parts of boehmite (available under the trade designation "DISPERAL" from Condea Chemie, GmbH of Hamburg, Germany) with 3000 parts of acidified water (prepared by mixing 3000 parts of deionized water with 71 parts of concentrated nitric acid) using a continuous mixer. The sol was dried at less than 160° C. for less than 48 hours. The dried material was crushed, and then screened to produce –150 mesh (U.S. Standards screen size) particles.

27.3 kilograms (sixty pounds) of the –150 mesh dried material were charged into a mixer (model FM-130D; available from Littleford-Day, Inc. of Florence, Ky.). 13.6 kg (thirty pounds) of tap water were sprayed into the mixer, while the latter was mixing. More specifically, the water was sprayed using a 18.9 liter (5 gallon) spray paint pressure vessel (available from Graco of Minneapolis, Minn.; Model # 236149, Series H96A) at a rate of about 13.6 kilograms/min (30 lbs./min.) under a pressure of 2.8 kg/cm$^2$ (40 psi). The resulting material was mixed for approximately 3 minutes. The resulting gel was extruded using a catalyst extruder (available from Bonnot Co. of Uniontown, Ohio) through a die having 150 3.3 mm (0.125 inch) diameter openings. The pressure inside the extruder, measured directly next to the die, was about 410 to 477 kg/cm$^2$ (1200 to 1400 psi). The extruded material was cut into rods about 1 cm in length by a rotary cutter as it emerged from the die.

The extruded rod material was dried overnight in aluminum trays in a forced air oven at a temperature of about 93° C. (212° F.). The dried rod material was calcined by placing it an alumina furnace boat, heating the boat to 750° C. over 6 hours, holding it for one hour at 750° C., and then cooling it to room temperature (~25° C.) overnight.

A rare earth oxide solution was prepared by mixing a lanthanum, neodymium, and yttrium nitrate solution (having, on a theoretical metal oxide basis, 23% rare earth oxide (i.e., La$_2$O$_3$, Nd$_2$O$_3$, and Y$_2$O$_3$); available from Molycorp of Louviers, Colo.) with a sufficient amount of magnesium nitrate solution (having, on a theoretical metal oxide basis, 11% MgO; available from Mallinckrodt Chemical of Paris, Ky.) and cobalt nitrate solution (having, on a theoretical metal oxide basis, 19% CoO; available from Hall Chemical of Wickliffe, Ohio) to provide a solution containing about 5.8% La(NO$_3$)$_3$.6H$_2$O, 5.8% Nd(NO$_3$)$_3$.6H$_2$O, about 7.1% Y(NO$_3$)$_3$.6H$_2$O, about 14.4% Mg(NO$_3$)$_2$.6H$_2$O, about 0.4% Co(NO$_3$)$_2$.6HO$_2$, and the balance deionized water.

For Comparative Example A, 10 of the calcined rods were dropped into a 400 ml beaker having about 50 ml of the rare earth nitrate solution therein. After about one minute, the rare earth oxide solution was decanted off. At the bottom of the container were 25 pieces of the rods (i.e., the rods split into 25 pieces).

For Example 1, 10 of the calcined rods were dropped into a 400 ml beaker having about 50 ml of the rare earth nitrate solution therein. The 400 ml beaker was then immediately pressurized to 5.4 atm. (80 psi) by placing the beaker in the 18.9 liter (5 gallon) spray paint pressure vessel (from Graco). After about 1 minute the pressure was released and the rare earth nitrate solution decanted off. At the bottom of the container were 27 pieces of the rods.

For Example 2, 10 of the calcined rods were placed in the bottom of the 18.9 liter (5 gallon) spray paint pressure vessel (from Graco). A 400 ml beaker containing 50 ml of the rare earth oxide solution was also placed in the pressure vessel. A pressure of 5.4 atm. (80 psi) was applied to the vessel, and then after about 1 minute, the vessel was tipped to spill the rare earth oxide solution onto the rods. After an additional minute, the pressure was released and the liquid decanted. Seventy one pieces of the rods were observed in the bottom of the vessel.

Examples 3–4 and Comparative Example B

A boehmite sol was prepared, dried, screened, converted to a gel, extruded, cut and dried as described for Examples 1–2. The resulting material was calcined as described for Examples 1–2 except the calcining temperature was 425° C.

For Comparative Example B, about 250 grams of the calcined rods were placed in the bottom of a 3.8 liter (1 gallon) spray paint pressure vessel (obtained under the trade designation "POWR-KRAFT PAINT TANK", Model QBW-6223B from Montgomery Ward). A high pressure piston pump was used to pump water into the vessel at a rate of 186 ml/min at 1 atmosphere of pressure. The pump was run for 5 minutes so that a total of 930 ml water was pumped into the vessel to completely immerse the rods. After the water had been pumped in, it was decanted off. The particles in the bottom were collected and dried, and then the distribution of sizes was determined by sieving (U.S. Standards screen sizes). The distribution of particle sizes is reported in Table 1 (below) as a percentage of particles retained on the particular sieve. Also included in the table is the distribution of sizes for calcined rods which were not subjected to impregnation with water (referred to as "control" in Table 1).

TABLE 1

| Mesh size | Control | Comp. Example B | Example 3 | Example 4 |
| --- | --- | --- | --- | --- |
| 10 | 94.8% | 17.9% | 6.6% | 5.1% |
| 12 | 3.8% | 25.9% | 17.5% | 14.7% |
| 14 | 0.7% | 29.8% | 30.5% | 27.8% |
| 16 | 0.3% | 16.4% | 24.1% | 24.5% |
| 20 | 0% | 7.8% | 16.9% | 21.4% |
| 25 | 0% | 0.8% | 2.1% | 3.3% |
| −25 | 0% | 1.5% | 2.4% | 3.2% |

Example 3 was prepared as described for Comparative Example B except an external air pressure of 2.7 atm (40 psi) was applied to the calcined rods using the 3.8 liter (1 gallon) spray paint pressure vessel (from Montgomery Ward). The results are shown in Table 1, above.

Example 4 was prepared as described for Comparative Example C except an external air pressure of 5.4 atm (80 psi) was applied to the calcined rods using the 3.8 liter (1 gallon) spray paint pressure vessel (from Montgomery Ward). The results are shown in Table 1, above.

The results in Table 1 show a shift in the distribution of particle sizes to smaller sizes with the application of the pressure prior to and during the impregnation of the calcined material.

Examples 5 and 6

A boehmite sol was prepared, dried, screened, converted to a gel, extruded, and cut as described for Examples 1–2 except the extruded rods were cut to 0.5 cm lengths (rather than 1 cm lengths). The resulting rods were dried slowly at about 70° C. The dried rod material was calcined by placing it an alumina furnace boat, heating the boat to 425° C. at a rate of 130° C./hr over 5 hours and then holding it for one hour at 425° C. Ten rods were then dropped into a 1000 ml beaker containing about 200 ml of the rare earth oxide solution. The beaker was then placed in a pressure vessel and 5.4 atm (80 psi) pressure applied and held for about 2 minutes. The wet rods were removed from the beaker and placed in a Büchner filter with #54 paper. An aspirator was used to aid in the removal of excess surface liquid. There were 30 particles observed after impregnation.

Example 6 was prepared as described for Example 5 except the calcining temperature was 750° C. Eighteen particles were counted after impregnation.

Although not wanting to be bound by theory, it is believed that the reason for the difference between the number of split rods is that at the higher calcining temperature the alumina crystallites have partially sintered together by the growth of neck regions between adjoining crystals.

Comparative Example C

Gel (prepared as described for Examples 1–2) was extruded using a catalyst extruder (available from Bonnot Co. of Uniontown, Ohio) through a die having thirty six 0.25 cm (0.1 inch) diameter openings, except that the rods were not cut as they exited the die. The pressure inside the extruder, measured directly next to the die, was about 410 to 477 kg/cm$^2$ (1200 to 1400 psi).

The extruded material was dried overnight in aluminum trays in a forced air oven at a temperature of about 93° C. (200° F). The dried rods were poured into a metal 76 liter (20 gallon) bin which caused the rods to break into segments in the range of about 5 cm (2 inches) to about 0.63 cm (0.25 inch). Approximately 1200 grams of the broken rods were placed in an alumina furnace boat and heated to 650° C. at a rate of 130° C./hr over 5 hours and then held for one hour at 650° C. After cooling, the (calcined) rods were screened using an 8 mesh screen to remove the smaller rods.

About 73 grams of the screened +8 mesh (calcined) rods were placed into a flask. Sealed to the opening of the flask was a graduated funnel having 200 ml of the rare earth nitrate solution therein. An aspirator was used to pull a vacuum over both the rods and the solution. After about 30 seconds, the solution began to boil and a valve on the graduated funnel was opened to allow the rare earth nitrate solution to fill the flask containing the rods. A great deal of bubbling was observed, which was believed to be due to the vacuum causing the air trapped in the pores of the rods to be expelled. After about 3 minutes, the vacuum was released and the rods were removed from the flask. The wet rods placed in a Büchner filter with #54 paper. An aspirator was used to aid in the removal of excess surface liquid.

The rods were dried in a forced air oven at 80° C. for about 64 hours (over the weekend). The dried, impregnated rods were again screened using the 8 mesh screen. Only about 6% (by weight) of the rods now passed through the 8 mesh screen.

Although not wanting to be bound by theory, it is believed that the number of rods experiencing conchoidally fracture was greatly reduced due to the partial vacuum that was pulled and maintained during the impregnation, and that the rods would have fractured if the impregnation had been carried out at ambient pressure (i.e., about 1 atmosphere).

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making alpha alumina-based ceramic abrasive grains, said method comprising the steps of:
    (a) impregnating an impregnation composition comprising a liquid into a plurality of initial, porous, calcined, elongated particles of alpha alumina-based precursor each having a longitudinal axis and internal interconnected pores, to cause conchoidal fracture of at least a portion of said initial elongated particles into smaller elongated particles, said fracture occurring generally in the direction of said longitudinal axis, wherein said initial elongated particles are subjected to an external pressure of at least 1.25 atm. during at least a portion of said impregnation such that the number of smaller particles is increased as compared to such impregnation of such initial particles at 1 atm.; and
    (b) converting said smaller elongated particles to alpha alumina-based ceramic abrasive grain.

2. The method according to claim 1 wherein said external pressure is at least 1.5 atm.

3. The method according to claim 1 wherein said external pressure is at least 2 atm.

4. The method according to claim 1 wherein said external pressure is at least 2.5 atm.

5. The method according to claim 4 wherein said impregnation composition further comprises at least one acidic metal oxide salt, and wherein, prior to completing step (b), said method further comprises the step of impregnating at least a portion of said smaller elongated particles with a composition comprising a mixture of liquid and at least one basic metal oxide salt.

6. The method according to claim 4 wherein at least a portion of said alpha alumina-based ceramic abrasive grain have an aspect ratio of at least 2.5:1.

7. The method according to claim 4 wherein immediately prior to said impregnation step, said elongated particle of alpha alumina-based precursor is subjected to an external pressure of at least 2.5 atm.

8. The method according to claim 1 wherein said external pressure is at least 4 atm.

9. The method according to claim 1 wherein said external pressure is at least 5 atm.

10. The method according to claim 1 wherein said composition consists essentially of said liquid.

11. The method according to claim 1 wherein said composition consists essentially of water.

12. The method according to claim 1 wherein immediately prior to said impregnation step, said elongated particle of alpha alumina-based precursor is subjected to an external pressure of at least 1.2 atm.

13. The method according to claim 1 wherein immediately prior to said impregnation step, said elongated particle of alpha alumina-based precursor is subjected to an external pressure of at least 1.5 atm.

14. The method according to claim 1 wherein immediately prior to said impregnation step, said elongated particle of alpha alumina-based precursor is subjected to an external pressure of at least 2 atm.

15. The method according to claim 1 wherein immediately prior to said impregnation step, said elongated particle of alpha alumina-based precursor is subjected to an external pressure of at least 2.5 atm.

16. The method according to claim 1 wherein immediately prior to said impregnation step, said elongated particle of alpha alumina-based precursor is subjected to an external pressure of at least 4 atm.

17. The method according to claim 1 wherein immediately prior to said impregnation step, said elongated particle of alpha alumina-based precursor is subjected to an external pressure of at least 5 atm.

18. A method for making alpha alumina-based ceramic abrasive grains, said method comprising the step of:
    (a) preparing a dispersion by combining components comprising water, acid, and boehmite;
    (b) converting at least a portion of said dispersion into a plurality of initial, porous, calcined, elongated particles of alpha alumina-based precursor each having a longitudinal axis and internal interconnected pores;
    (c) impregnating an impregnation composition comprising a liquid into said initial elongated particles to cause conchoidal fracture of at least a portion of said initial elongated particles into smaller elongated particles, said fracture occurring generally in the direction of said longitudinal axis, wherein said initial elongated particles are subjected to an external pressure of at least 1.25 atm. during at least a portion of said impregnation such that the number of smaller particles is increased as compared to such impregnation of such initial particles at 1 atm.; and
    (d) converting said smaller elongated particles to alpha alumina-based ceramic abrasive grain.

19. The method according to claim 18 wherein said external pressure is at least 2 atm.

20. The method according to claim 18 wherein said external pressure is at least 2.5 atm.

21. The method according to claim 20 wherein immediately prior to said impregnation step, said elongated particle of alpha alumina-based precursor is subjected to an external pressure of at least 2.5 atm.

22. The method according to claim 18, said abrasive grain have a density greater than 90 percent of theoretical.

23. The method according to claim 18 wherein said liquid is water.

24. The method according to claim 23 wherein said composition comprises a mixture of said water and at least one metal oxide precursor.

25. The method according to claim 23 wherein step (b) includes extruding said dispersion.

26. The method according to claim 25 wherein at least a portion of said alpha alumina-based ceramic abrasive grain are rods.

27. The method according to claim 23 wherein said composition comprises a mixture of said water and at least one precursor of an oxide selected from the group consisting of magnesium oxide, cobalt oxide, nickel oxide, iron oxide, cerium oxide, zirconium oxide, hafnium oxide, lithium oxide, manganese oxide, chromium oxide, yttrium oxide, praseodymium oxide, samarium oxide, ytterbium oxide, neodymium oxide, lanthanum oxide, gadolinium oxide, dysprosium oxide, erbium oxide, europium oxide, titanium oxide, and zinc oxide.

28. The method according to claim 18 wherein said dispersion further comprises, in addition to said boehmite, at least one of a metal oxide or a precursor thereof.

29. The method according to claim 18 wherein said dispersion comprises greater than 60% by weight of said boehmite, based on the total weight of said dispersion.

30. The method according to claim 18 wherein the abrasive grain comprises at least 0.5 percent by weight of oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, and ZnO, based on the total metal oxide content of said abrasive grain.

31. The method according to claim 18 wherein said abrasive grain comprises at least about 2 percent by weight of oxide selected from the group consisting of MgO, CoO, NiO, $Ce_2O_3$, $ZrO_2$, $HfO_2$, $Li_2O$, MnO, $Cr_2O_3$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, $Eu_2O_3$, $TiO_2$, $Fe_2O_3$, $SnO_2$, and ZnO, based on the total metal oxide content of said abrasive grain.

32. The method according to claim 18 wherein said dispersion further comprises a nucleating material.

33. A method for making alpha alumina-based ceramic abrasive grains, said method comprising the steps of:

(a) preparing a first dispersion by combining components comprising water, acid, and boehmite;

(b) drying the first dispersion to provide alpha alumina-based precursor material;

(c) combining components comprising water and at least a portion of said alpha alumina-based precursor material to provide a second dispersion;

(d) converting at least a portion of said second dispersion into initial porous, calcined, elongated particles of alpha alumina-based precursor each having a longitudinal axis and internal interconnected pores;

(e) impregnating an impregnation composition comprising a liquid into said initial elongated particles to cause conchoidal fracture of at least a portion of said initial elongated particles into smaller elongated particles, said fracture occurring generally in the direction of said longitudinal axis, wherein said initial elongated particles are subjected to an external pressure of at least 1.25 atm. during at least a portion of said impregnation such that the number of smaller particles is increased as compared to such initial impregnation of such particles at 1 atm.; and (f) converting said smaller elongated particles to alpha alumina-based ceramic abrasive grain.

34. A method for making alpha alumina-based ceramic abrasive grains, said method comprising the steps of:

(a) preparing a first dispersion by combining components comprising water, acid, and boehmite;

(b) drying the first dispersion to provide alpha alumina-based precursor material;

(c) combining components comprising water, boehmite, and at least a portion of said alpha alumina-based precursor material to provide a second dispersion;

(d) converting at least a portion of said second dispersion into initial, porous, calcined, elongated particles of alpha alumina-based precursor each having a longitudinal axis and internal interconnected pores;

(e) impregnating an impregnation composition comprising a liquid into said initial elongated particles to cause conchoidal fracture of at least a portion of said initial elongated particles into smaller elongated particles, said fracture occurring generally in the direction of said longitudinal axis, wherein said initial elongated particles are subjected to an external pressure of at least 1.25 atm. during at least a portion of said impregnation such that the number of smaller particles is increased as compared to such impregnation of such initial particles at 1 atm.; and (f) converting said smaller elongated particles to alpha alumina-based ceramic abrasive grain.

35. A method for making an abrasive article, said method comprising the steps of:

(a) impregnating an impregnation composition comprising a liquid into a plurality of initial porous, calcined, elongated particles of alpha alumina-based precursor each having a longitudinal axis and internal pores, to cause conchoidal fracture of at least a portion of said initial elongated particles into smaller elongated particles, said fracture occurring generally in the direction of said longitudinal axis, wherein said initial elongated particles are subjected to an external pressure of at least 1.25 atm. during at least a portion of said impregnation such that the number of smaller particles is increased as compared to such impregnation of such initial particles at 1 atm.; and (b) converting said smaller elongated particles to alpha alumina-based ceramic abrasive grain; and (c) combining a plurality of said alpha alumina-based ceramic abrasive grain with binder to provide an abrasive article.

36. The method according to claim 35 wherein said abrasive article is a coated abrasive article that includes a backing.

37. The method according to claim 35 wherein step (c) includes combining fused alumina abrasive grain with said binder.

38. The method according to claim 1 wherein at least a portion of said alpha alumina-based ceramic abrasive grain have an aspect ratio of at least 2.5:1.

39. The method according to claim 1 wherein at least a portion of said alpha alumina-based ceramic abrasive grain have an aspect ratio of at least 4:1.

40. The method according to claim 1 wherein at least a portion of said alpha alumina-based ceramic abrasive grain have an aspect ratio of at least 5:1.

41. The method according to claim 4 wherein at least a portion of said alpha alumina-based ceramic abrasive grain have an aspect ratio of at least 4:1.

42. The method according to claim 4 wherein at least a portion of said alpha alumina-based ceramic abrasive grain have an aspect ratio of at least 5:1.

43. The method according to claim 18 wherein at least a portion of said alpha alumina-based ceramic abrasive grain have an aspect ratio of at least 2.5:1.

44. The method according to claim 18 wherein at least a portion of said alpha alumina-based ceramic abrasive grain have an aspect ratio of at least 4:1.

45. The method according to claim 18 wherein at least a portion of said alpha alumina-based ceramic abrasive grain have an aspect ratio of at least 5:1.

46. The method according to claim 33 wherein at least a portion of said alpha alumina-based ceramic abrasive grain have an aspect ratio of at least 2.5:1.

47. The method according to claim 33 wherein at least a portion of said alpha alumina-based ceramic abrasive grain have an aspect ratio of at least 4:1.

48. The method according to claim 33 wherein at least a portion of said alpha alumina-based ceramic abrasive grain have an aspect ratio of at least 5:1.

49. The method according to claim 34 wherein at least a portion of said alpha alumina-based ceramic abrasive grain have an aspect ratio of at least 2.5:1.

50. The method according to claim 34 wherein at least a portion of said alpha alumina-based ceramic abrasive grain have an aspect ratio of at least 4:1.

51. The method according to claim 34 wherein at least a portion of said alpha alumina-based ceramic abrasive grain have an aspect ratio of at least 5:1.

52. The method according to claim 35 wherein at least a portion of said alpha alumina-based ceramic abrasive grain have an aspect ratio of at least 2.5:1.

53. The method according to claim 52 wherein said abrasive article is a grinding wheel.

54. The method according to claim 52 wherein said abrasive article is a cutoff wheel.

55. The method according to claim 35 wherein at least a portion of said alpha alumina-based ceramic abrasive grain have an aspect ratio of at least 4:1.

56. The method according to claim 55 wherein said abrasive article is a grinding wheel.

57. The method according to claim 55 wherein said abrasive article is a cutoff wheel.

58. The method according to claim 35 wherein at least a portion of said alpha alumina-based ceramic abrasive grain have an aspect ratio of at least 5:1.

59. The method according to claim 58 wherein said abrasive article is a grinding wheel.

60. The method according to claim 58 wherein said abrasive article is a cutoff wheel.

* * * * *

UNITED STATES PATENT AND TRADEMARK OFFICE
CERTIFICATE OF CORRECTION

PATENT NO.   : 6,053,956
DATED        : April 25, 2000
INVENTOR(S)  : William P. Wood Page 1 of 1

It is certified that error appears in the above-identified patent and that said Letters Patent is hereby corrected as shown below:

Column 8,
Line 63, "$(Zn(NO_3)_3 \cdot _6H_2O)$," should read --$(Zn(NO_3)_3 \cdot 6H_2O)$,--

Column 17,
Line 2, "bc" should read --be--

Column 20,
Line 62, "$La(NO_3)_3{}^-{}_6H_2O$," should read --$La(NO_3)_3 \cdot 6H_2O$ --

Signed and Sealed this

Third Day of July, 2001

*Attest:*

NICHOLAS P. GODICI

*Attesting Officer*  *Acting Director of the United States Patent and Trademark Office*